(12) United States Patent
Liu et al.

(10) Patent No.: US 11,875,336 B2
(45) Date of Patent: Jan. 16, 2024

(54) METHOD AND APPARATUS FOR MIGRATING PAYMENT CARD, ELECTRONIC DEVICE, SERVER AND MEDIUM

(71) Applicant: CHINA UNIONPAY CO., LTD., Shanghai (CN)

(72) Inventors: Gang Liu, Shanghai (CN); Cheng Peng, Shanghai (CN); Quan Sun, Shanghai (CN); Zhenzhong Zou, Shanghai (CN); Ailong Zhang, Shanghai (CN); Chengchu Zhan, Shanghai (CN); Hua Cai, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/920,596

(22) PCT Filed: Sep. 14, 2021

(86) PCT No.: PCT/CN2021/118145
§ 371 (c)(1),
(2) Date: Oct. 21, 2022

(87) PCT Pub. No.: WO2022/166208
PCT Pub. Date: Aug. 11, 2022

(65) Prior Publication Data
US 2023/0153789 A1    May 18, 2023

(30) Foreign Application Priority Data
Feb. 5, 2021  (CN) .......................... 202110170123.X

(51) Int. Cl.
| | | |
|---|---|---|
| *G06Q 20/34* | (2012.01) | |
| *G06Q 20/32* | (2012.01) | |
| *G06Q 20/40* | (2012.01) | |

(52) U.S. Cl.
CPC ....... *G06Q 20/341* (2013.01); *G06Q 20/3229* (2013.01); *G06Q 20/3263* (2020.05); *G06Q 20/4097* (2013.01)

(58) Field of Classification Search
CPC .................................................. G06Q 20/341
(Continued)

(56) References Cited

U.S. PATENT DOCUMENTS

| 10,902,405 B1 | 1/2021 | Maeng |
| 2016/0132866 A1 | 5/2016 | Gui et al. |

(Continued)

FOREIGN PATENT DOCUMENTS

| CN | 103746792 B | 11/2017 |
| CN | 108604345 A | 9/2018 |

(Continued)

OTHER PUBLICATIONS

International Search Report and Written Opinion dated Dec. 16, 2021 for International PCT application No. PCT/CN2021/118145.

(Continued)

*Primary Examiner* — Rafferty D Kelly
(74) *Attorney, Agent, or Firm* — K&L Gates LLP

(57) ABSTRACT

The present application discloses a method and an apparatus for migrating payment card, an electronic device, a server and a medium. The method for migrating payment card includes: receiving payment card migration operation after an account is logged in on the first electronic device; displaying, in response to payment card migration operation, at least one device identifier which is an identifier of a target electronic device on which the account had been logged in;

(Continued)

receiving a first selecting operation for a target device identifier of the at least one device identifier; and sending, in response to the first selecting operation, the target device identifier to a server, to cause the server to migrate a payment card bound to a second electronic device to the first electronic device, wherein the second electronic device is an electronic device corresponding to the target device identifier of at least one target electronic device.

10 Claims, 10 Drawing Sheets

(58) Field of Classification Search
USPC .......................................................... 235/380
See application file for complete search history.

(56) References Cited

U.S. PATENT DOCUMENTS

2019/0392417 A1   12/2019   Li et al.
2020/0372490 A1*  11/2020   Ding ................... G06Q 20/3278

FOREIGN PATENT DOCUMENTS

| CN | 109544135 A | 3/2019 |
| CN | 109842605 A | 6/2019 |
| CN | 110545526 A | 12/2019 |
| CN | 111311251 A | 6/2020 |
| CN | 112118227 A | 12/2020 |
| CN | 112801655 A | 5/2021 |
| JP | 2004287594 A | 10/2004 |
| JP | 2004287594 A | 9/2018 |
| TW | 201933212 A | 8/2019 |
| WO | WO2020258748 A1 | 12/2020 |

OTHER PUBLICATIONS

CNIPA Office Action dated Jul. 6, 2023 for Chinese Patent Application No. 202110170123.X.
Office Action dated Nov. 1, 2022 for Taiwanese Patent Application No. 110143406.
Rejection Decision dated Mar. 29, 2023 for Taiwanese Patent Application No. 110143406.
Office Action dated Oct. 16, 2023 issued for Japanese Patent Application No. 2022-564657.

* cited by examiner

METHOD AND APPARATUS FOR MIGRATING PAYMENT CARD, ELECTRONIC DEVICE, SERVER AND MEDIUM

CROSS REFERENCE TO RELATED APPLICATION

This application is a National Stage of International Application No. PCT/CN2021/118145, filed on Sep. 14, 2021, which claims priority to Chinese Patent Application No. 202110170123.X, filed on Feb. 5, 2021 and entitled "METHOD AND APPARATUS FOR MIGRATING PAYMENT CARD, ELECTRONIC DEVICE, SERVER AND MEDIUM". Both of the applications are incorporated herein by reference in their entireties for all purposes.

TECHNICAL FIELD

The present application relates to a computer technical field, and in particular, to a method and apparatus for migrating payment card, an electronic device, a server and a medium.

BACKGROUND

With a development of computer technology, online payment has become more and more common. Before a user makes an online payment with an electronic device, the electronic device needs to be bound to a payment card, for example, the electronic device is bound to the bank card through a wallet application installed on the electronic device. After binding, the bound payment card may be used for online payment.

If the user wants to migrate a payment card bound to one electronic device to another electronic device, the user needs to unbind the payment card from the one electronic device first, and then bind the payment card to the another electronic device. Each time a payment card is bound, the user is required to perform unbinding and binding operations.

Therefore, the user needs to perform a plurality of operations to realize a payment card migration, resulting in that the payment card migration operations performed by the user are very cumbersome.

SUMMARY

Embodiments of the present application provide a method and apparatus for migrating payment card, an electronic device, a server, and a medium.

In a first aspect, an embodiment of the present application provides a method for migrating payment card, applicable to a first electronic device, the method including: receiving a payment card migration operation after an account is logged in on the first electronic device; displaying, in response to the payment card migration operation, at least one device identifier, wherein the at least one device identifier is an identifier of a target electronic device on which the account had been logged in; receiving a first selecting operation for a target device identifier of the at least one device identifier; and sending, in response to the first selecting operation, the target device identifier to a server, to cause the server to migrate a payment card bound to a second electronic device to the first electronic device, wherein the second electronic device is an electronic device corresponding to the target device identifier of at least one target electronic device.

In a second aspect, an embodiment of the present application provides method for migrating payment card, applicable to a server, the method including: receiving a target device identifier sent by a first electronic device after an account is logged in on the first electronic device, wherein the target device identifier is a device identifier selected by an user from at least one device identifier, and the at least one device identifier is an identifier of a target electronic device on which the account had been logged in; and migrating a payment card bound to a second electronic device to the first electronic device based on the target device identifier, wherein the second electronic device is an electronic device corresponding to the target device identifier of at least one target electronic device.

In a third aspect, an embodiment of the present application provides an apparatus for migrating payment card, applicable to a first electronic device, the apparatus including: a first receiving module configured to receive a payment card migration operation after an account is logged in on the first electronic device; a first display module configured to display, in response to the payment card migration operation, at least one device identifier, wherein the at least one device identifier is an identifier of a target electronic device on which the account had been logged in; a second receiving module configured to receive a first selecting operation for a target device identifier of the at least one device identifier; and a first sending module configured to send, in response to the first selecting operation, the target device identifier to a server, to cause the server to migrate a payment card bound to a second electronic device to the first electronic device, wherein the second electronic device is an electronic device corresponding to the target device identifier of at least one target electronic device.

In a fourth aspect, an embodiment of the present application provides an apparatus for migrating payment card, applicable to a server, the apparatus including: a third receiving module configured to receive a target device identifier sent by a first electronic device after an account is logged in on the first electronic device, wherein the target device identifier is a device identifier selected by an user from at least one device identifier, and the at least one device identifier is an identifier of a target electronic device on which the account had been logged in; and a migrating module configured to migrate a payment card bound to a second electronic device to the first electronic device based on the target device identifier, wherein the second electronic device is an electronic device corresponding to the target device identifier of at least one target electronic device.

In a fifth aspect, an embodiment of the present application provides an electronic device, including a processor and a memory storing computer program instructions, wherein the processor is configured to implement, when executing the computer program instructions, steps of the method for migrating payment card provided by the first aspect.

In a sixth aspect, an embodiment of the present application provides a server, including a processor and a memory storing computer program instructions, wherein the processor is configured to implement, when executing the computer program instructions, steps of the method for migrating payment card provided by the second aspect.

In a seventh aspect, an embodiment of the present application provides a computer storage medium on which computer program instructions are stored, wherein the computer program instructions, when executed on a processor, cause the processor to implement steps of the method for migrating payment card provided by the first aspect or the method for migrating payment card provided by the second aspect.

BRIEF DESCRIPTION OF THE DRAWINGS

In order to explain the technical solutions of the embodiments of the present application more clearly, the following briefly introduces the drawings that need to be used in the embodiments of the present application. Obviously, the drawings described below are only some embodiments of the present application. For those ordinary skilled in the art, other drawings may further be obtained from these drawings without the exercise of inventive faculty.

DETAILED DESCRIPTION

Figure 1:
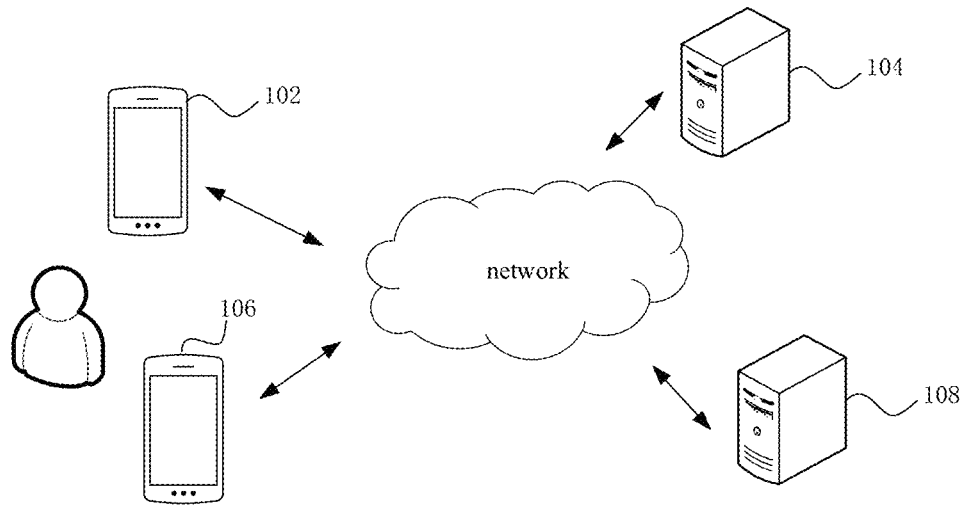
FIG. 1 is a schematic diagram of an embodiment of a system for implementing a method for migrating payment card provided by the present application.

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only intended to explain the present application, and not intended to limit the present application. It will be apparent to those skilled in the art that the present application may be practiced without some of these specific details. The following description of the embodiments is merely to provide a better understanding of the present application by illustrating examples of the present application.

It should be noted that, relational terms such as first and second herein are only used to distinguish one entity or operation from another entity or operation, and do not necessarily require or imply that any such relationship or sequence actually exists among these entities or operations. In addition, the terms "include", "comprise" or any other variation thereof are intended to encompass non-exclusive inclusion, such that a process, method, article or device which includes a list of elements includes not only those elements, but also other elements which are not explicitly listed or elements inherent to such process, method, article or device. Without further limitation, an element defined by the phrase "include" does not preclude the presence of additional identical elements in the process, method, article, or device that includes the element.

In some scenarios, a payment card bound to one electronic device needs to be migrated to another electronic device. For example, in a scenario that an electronic device is to be changed, it is necessary to migrate a payment card bound to an old electronic device to a new electronic device. In the related art, a device-changing card binding solution is provided, and the device-changing card binding solution includes the following steps that:

1) a user needs to unbind a payment card bound to a first electronic device from the first electronic device in advance;
2) the user turns on and activates a second electronic device, and logs in an account on the second electronic device;
3) the user opens a wallet application on the second electronic device, clicks "add a card", then scans or adds a card, and selects a type of card to be added to the wallet application;
4) the user manually enters card detail information, and the user chooses to enter a card number and a short message verification code for the payment card, and in addition, under a condition that the payment card is a credit card, the user needs to manually enter a validity period and a CVN2 (Card Verification Number 2, security code) for verification; and
5) after the verification is passed, operations for device-changing card binding are completed.

With the device-changing card binding solution described above, a payment card bound to one electronic device may be migrated to another electronic device. However, when the user needs to bind a plurality of payment cards, the above steps 3-5 need to be repeated. In this case, the user needs to perform a plurality of operations to realize a payment card migration, resulting in that the payment card migration operations performed by the user are very cumbersome.

With respect to the above technical problem, the present application provides a method for migrating payment card. The following first illustrates a system for implementing the method for migrating payment card.

FIG. 1 is a schematic diagram of an embodiment of a system for implementing a method for migrating payment card provided by the present application. As shown in FIG. 1, the system for implementing the method for migrating payment card includes a first electronic device 102 (e.g., a new electronic device), a server 104, a second electronic device 106 (e.g., an old electronic device), and a trusted service manager (TSM) system 108.

After an account is logged in on the first electronic device 102 and the first electronic device 102 receives a payment card (e.g., a bank card, a shopping card, a membership card, or the like) migration operation, it displays at least one device identifier which is an identifier of an electronic device on which the above account had been logged in, for the user to perform selecting from at least one device identifier. Under a condition that the first electronic device 102 receives a first selecting operation for a target device identifier of the at least one device identifier, it sends the target device identifier to the server 104 to notify the server 104 that a payment card bound to the second electronic device 106 corresponding to the target device identifier needs to be migrated to the first electronic device 102.

Under a condition that the server 104 receives the target device identifier, it migrates the payment card bound to the second electronic device 106 corresponding to the target device identifier to the first electronic device 102. In particular, the server 104 sends a card binding request to the TSM system 108 to migrate the payment card bound to the second electronic device 106 to the first electronic device 102 by the TSM system 108.

Therefore, a payment card migration is realized. Since a plurality of payment cards bound to the second electronic device 106 may be migrated to the first electronic device 102 simultaneously, the user does not need to perform unbinding and binding operations on the payment cards bound to the second electronic device 106 respectively, which simplifies the payment card migration operations performed by the user.

Figure 2:
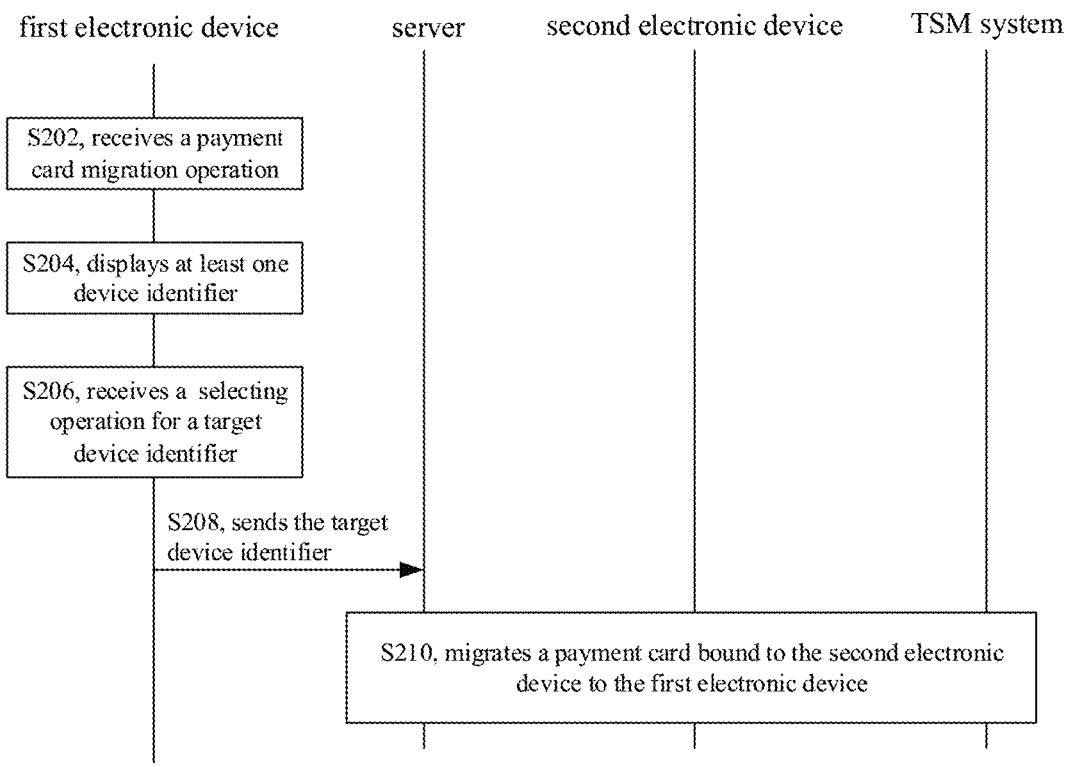
FIG. 2 is a schematic flowchart of an embodiment of a method for migrating payment card provided by the present application.

Based on the above system, the method for migrating payment card provided by the present application will be illustrated below. FIG. 2 is a schematic flowchart of an embodiment of a method for migrating payment card provided by the present application. As shown in FIG. 2, the method for migrating payment card includes the follows.

In S202, a first electronic device receives a payment card migration operation after an account is logged in on the first electronic device.

In S202, as some examples, a payment application (e.g., a wallet application) may be installed on the first electronic device, and after an account is logged in on the payment application on the first electronic device, a payment card migration widget may be displayed on an interface of the payment application. The first electronic device receives a touch operation on the payment card migration widget by the user. The touch operation on the payment card migration widget by the user may be a click operation, a long-press operation, a double-click operation, or the like.

Further, the payment card migration operation is not limited to the touch operation on the payment card migration widget, but may also be a voice input operation. The payment card migration operation is not limited herein.

The method for migrating payment card further includes that: in S204, the first electronic device displays, in response to the payment card migration operation, at least one device identifier, and the at least one device identifier is an identifier of a target electronic device on which the account had been logged in.

In S204, as some examples, the first electronic device may send a request to a server to request to obtain the identifier(s) of the target electronic device(s) on which the above account had been logged in. Under a condition that the first electronic device receives the at least one device identifier sent by the server, it displays the at least one device identifier for the user to select, from the at least one device identifier, a second electronic device for which a payment card needs to be migrated to the first electronic device.

In an embodiment of the present application, the device identifier may be a model of the target electronic device on which the above account had been logged in, or the device identifier may be a user-defined name of the target electronic device on which the above account had been logged in.

The target electronic device may be an electronic device on which the above account had been logged in and a payment card is bound. In this way, the displayed at least one device identifier is an identifier of an electronic device bound with a payment card, and an electronic device which is not bound with a bank card is not to be displayed, thereby facilitating the user to select an identifier of an electronic device for which a migration is to be performed.

The method for migrating payment card further includes that: in S206, the first electronic device receives a first selecting operation for a target device identifier of the at least one device identifier.

In S206, the first electronic device may receive a touch operation on the target device identifier of the at least one device identifier by the user. In this case, the user selects the target device identifier, which is equivalent to that the user selects the second electronic device corresponding to the target device identifier and for which a payment card migration is to be performed.

The method for migrating payment card further includes that: in S208, the first electronic device sends, in response to the first selecting operation, the target device identifier to a server; and in S210, after the server receives the target device identifier, it migrates a payment card bound to the second electronic device to the first electronic device, and the second electronic device is an electronic device corresponding to the target device identifier of at least one target electronic device.

In S210, the server may send a card binding request to the TSM system. After TSM system receives the card binding request, it unbinds the bound payment card bound to the second electronic device from the second electronic device, and binds unbound the payment card to the first electronic device.

In particular, the card binding request may include a payment card code (e.g., mpan-id) bound to a security environment identifier (SEID) of the second electronic device. In this case, a card binding application channel type (applyChannelType) of the card binding request is "04 Channel". After the TSM system receives the card binding request, it searches a corresponding field (span) based on the payment card code in the card binding request, and performs a card binding process based on the found field. During the performing of the card binding process, the TSM system sends an authentication request to a card issuing bank, to cause the card issuing bank to perform a verification. The card issuing bank system may verify at least one of a CVN2 (for a credit card, this item will not be verified), a validity period, a one-time password (OTP), and a password (for a credit card, this item will not be verified). After the verification by the issuing bank is completed, a mapping relationship of the payment card bound to the second electronic device is set to a linked state, and a response is sent to the TSM system.

With the embodiment of the present application, a plurality of payment cards bound to the second electronic device may be migrated to the first electronic device simultaneously, and the user does not need to perform unbinding and binding operations on the payment cards bound to the second electronic device respectively, which simplifies the payment card migration operations performed by the user.

In the related art, for security reasons, each time a payment card is bound to an electronic device, the user is required to manually input a short message verification code. Further, under a condition that the payment card is a credit card, the user is further required to manually input a validity period and a card verification number (CVN). In this case, in order to ensure security, a binding of bank card becomes more complicated, and the card binding operations are extremely cumbersome.

Figure 3:
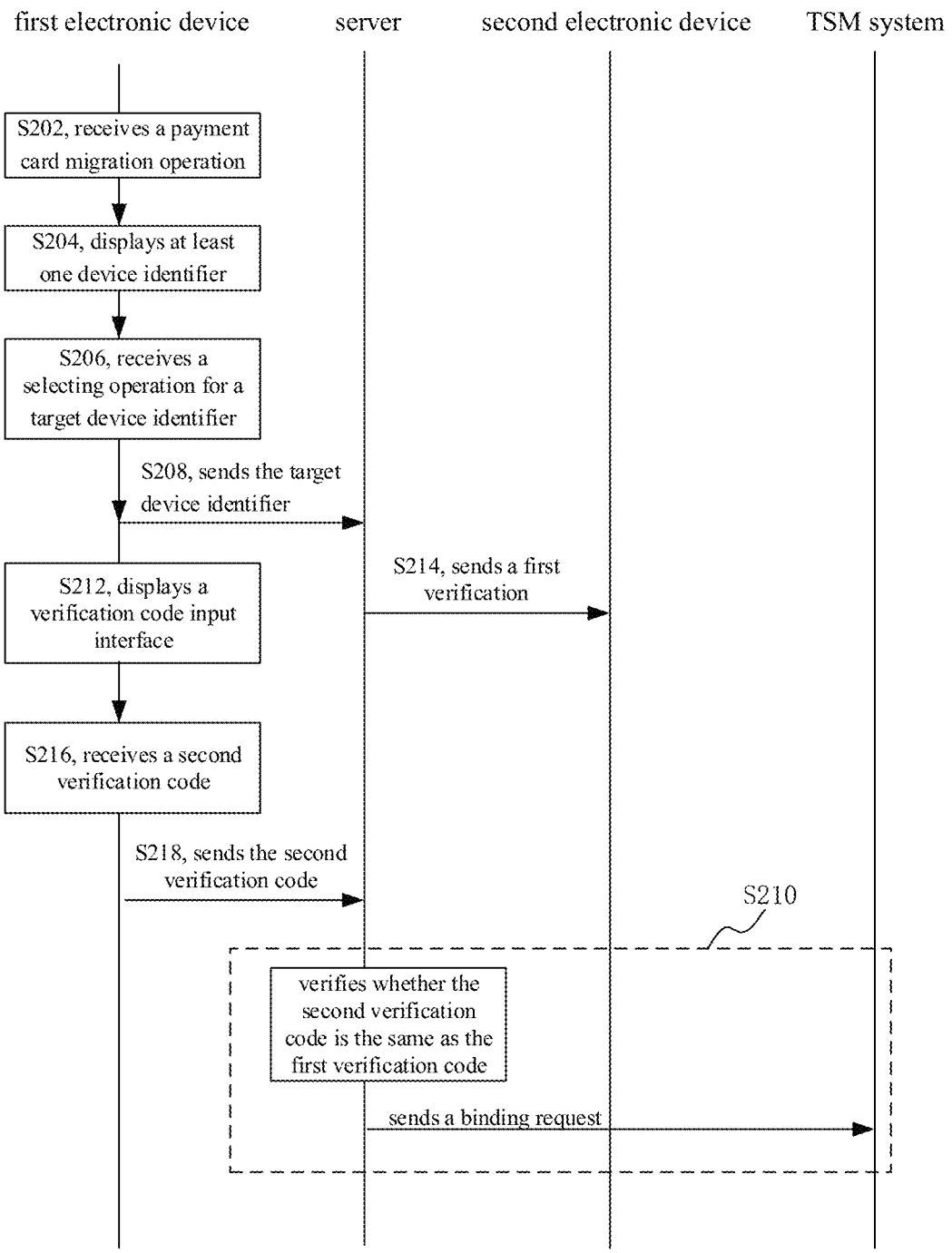
FIG. 3 is a schematic flowchart of another embodiment of a method for migrating payment card provided by the present application.

In order to solve the technical problem that the card binding operations are extremely cumbersome for ensuring security, in one or more embodiments of the present application, as shown in FIG. 3, after S206, the method for migrating payment card may further include the follows.

In S212, the first electronic device displays a verification code input interface.

In S214, under a condition that the server receives the target device identifier, it sends a first verification code to the second electronic device corresponding to the target device identifier, based on the target device identifier.

In S216, the first electronic device receives an input operation for inputting a second verification code on the verification code input interface.

In S218, the first electronic device sends, in response to the input operation, the second verification code to the server.

In this embodiment of the present application, S210 may particularly include that: under a condition that the server verifies that the second verification code is the same as the first verification code, which indicates that the user of the second electronic device is a legitimate user, and the server migrates the payment card bound to the second electronic device to the first electronic device.

In an embodiment of the present application, before a payment card migration is performed, the server sends the first verification code to the second electronic device. If the first electronic device and the second electronic device belong to a same user or belong to two users with an associated relationship respectively, the user of the first electronic device may obtain the first verification code received by the second electronic device, and input the first verification code on the verification code input interface of the first electronic device. In this way, whether the user who performs the card migration operation is a legitimate user may be verified by using the verification code, thereby ensuring the security during a payment card migration process.

Further, if a plurality of payment cards bound to the second electronic device need to be migrated to the first electronic device, the user only needs to input the verification code once, and does not need to input the verification code every time a payment card is bound. Moreover, the user does not need to input information such as a validity period and a card confirmation code of the payment card, which may further simplify the payment card migration operations.

In one or more embodiments of the present application, the server sending the first verification code to the second electronic device corresponding to the target device identifier based on the target device identifier may include that: under a condition that the above account has been logged in on a payment application on the second electronic device, the server sends the first verification code to the payment application on which the account has been logged in.

In particular, if the server sends the first verification code to the payment application on which the above account has been logged in, the payment application on the second electronic device may receive the first verification code sent by the server through a network under a condition that the above account has been logged in on the payment application on the second electronic device and the payment application on the second electronic device is connected to the network. For example, under a condition that the second electronic device is connected to a wireless network (e.g., Wi-Fi, which is called Wireless-Fidelity), the second electronic device may receive the first verification code sent by the server through the wireless network.

In this way, by using a feature that a same account may be logged in on multiple electronic devices at a same time, when the account is logged in on the payment application on the first electronic device for performing a payment card migration process, the account may also be logged in on the payment application on the second electronic device, which enables that the second electronic device may receive the first verification code sent by the server. Thus, the user does no need to perform additional operations, and it is convenient for the user to migrate the payment card.

In one or more embodiments of the present application, the server sending the first verification code to the second electronic device corresponding to the target device identifier based on the target device identifier may include that: under a condition that a subscriber identity module (SIM) card has been installed on the second electronic device and a communication number corresponding to the SIM card is a predetermined communication number bound to the account, the server sends the first verification code to the communication number corresponding to the SIM card.

As some examples, the server may send a short message including the first verification code to the communication number corresponding to the SIM card, or the server may send voice information including the first verification code to the communication number corresponding to the SIM card.

In one or more embodiments of the present application, after the first electronic device responds to the first selecting operation, the method for migrating payment card may further include that: the first electronic device displays at least one payment card identifier which is an identifier of a payment card bound to the second electronic device; the first electronic device receives a second selecting operation for a target payment card identifier of the at least one payment card identifier; and the first electronic device sends, in response to the second selecting operation, the target payment card identifier to the server; and after the server receives the target payment card identifier, it migrate a target payment card bound to the second electronic device to the first electronic device, and the target payment card is a payment card corresponding to the target payment card identifier.

As some examples, after the first electronic device receives the first selecting operation for the target device identifier of the at least one device identifier, the first electronic device may display the at least one payment card identifier; or under a condition that the first electronic device receives information sent by the server which indicates that the second verification code is the same as the first verification code, the first electronic device displays the at least one payment card identifier.

In the embodiment of the present application, after the user selects the second electronic device for which a migration for the payment card bound thereto is to be performed, the identifier(s) of the payment card(s) bound to the second electronic device may be displayed on the first electronic device, for the user to select which one of the payment cards bound to the second electronic device is to be migrated. The user may choose to migrate all or some of the bank cards bound to the second electronic device based on his/her requirements. In this way, the user may select the payment card to be migrated on his/her own, to satisfy the user's usage needs.

In an embodiment of the present application, the payment card identifier may be a payment card number, a card-activating time, or a name of a card-activating company.

In some cases, it is possible that the identifiers of a plurality of electronic devices are the same as one another. For example, if the identifier of the electronic device is a model of the electronic device, the identifiers of two electronic devices with the same model are the same as each other. In this case, it is difficult for the user to distinguish the electronic devices with the same identifier, resulting in that the selected target device identifier may be not an identifier of an electronic device for which the migration is to be performed.

Before the user selects the target device identifier, in order to facilitate the user to distinguish respective electronic devices, in one or more embodiments of the present application, in response to the payment card migration operation and before receiving the first selecting operation for the target device identifier of the at least one device identifier, the method for migrating payment cards may further include: displaying information of a payment card bound to the target electronic device.

As some examples, the information of payment card bound to each target electronic device may be displayed, while the at least one device identifier is displayed; or under a condition that a touch input on a certain device identifier is received, the information of a payment card bound to the target electronic device corresponding to the device identifier may be displayed.

In an embodiment of the present application, the information of the payment card may include at least one of a name of a card-activating company of the payment card (e.g., a certain bank), an identifier of the card-activating company of the payment card, and a card-activating time.

In the embodiment of the present application, by displaying the information of the payment card bound to the target electronic device, it is convenient for the user to distinguish respective electronic devices, so as to facilitate the user to select the target device identifier from the at least one device identifier, and the selected target device identifier is an identifier of an electronic device for which the user intends to perform the migration.

In one or more embodiments of the present application, before the server migrates the payment card bound to the second electronic device to the first electronic device based on the target device identifier, the method for migrating payment card may further include: obtaining at least one piece of device information from pre-stored information, based on an user identification (UID) corresponding to the account, wherein the at least one piece of device information includes hardware information of at least one electronic device to which a payment card has been bound through the account.

The migrating the payment card bound to the second electronic device to the first electronic device based on the target device identifier may include: under a condition that information of the second electronic device matches any one of the at least one piece of device information, migrating the payment card bound to the second electronic device to the first electronic device based on the target device identifier.

In this way, whether the second electronic device has been bound with a payment card through the above account can be further verified.

The method for migrating payment card of any one of the embodiments provided by the present application may be applicable to a scenario that an electronic device is to be changed, and the payment card bound to an old electronic device is to be migrated to a new electronic device. It may also be applicable to a scenario that an electronic device is formatted. After formatting, the formatted electronic device is not bound with any payment card. By using the method for migrating payment card of any of the above embodiments, the payment card bound to the electronic device before formatting may be migrated to the formatted electronic device.

The method for migrating payment card according to the embodiments provided by the present application will be described with reference to the schematic diagrams of FIG. 4 to FIG. 8, by taking a changing of an electronic device as an example below.

Figure 4:
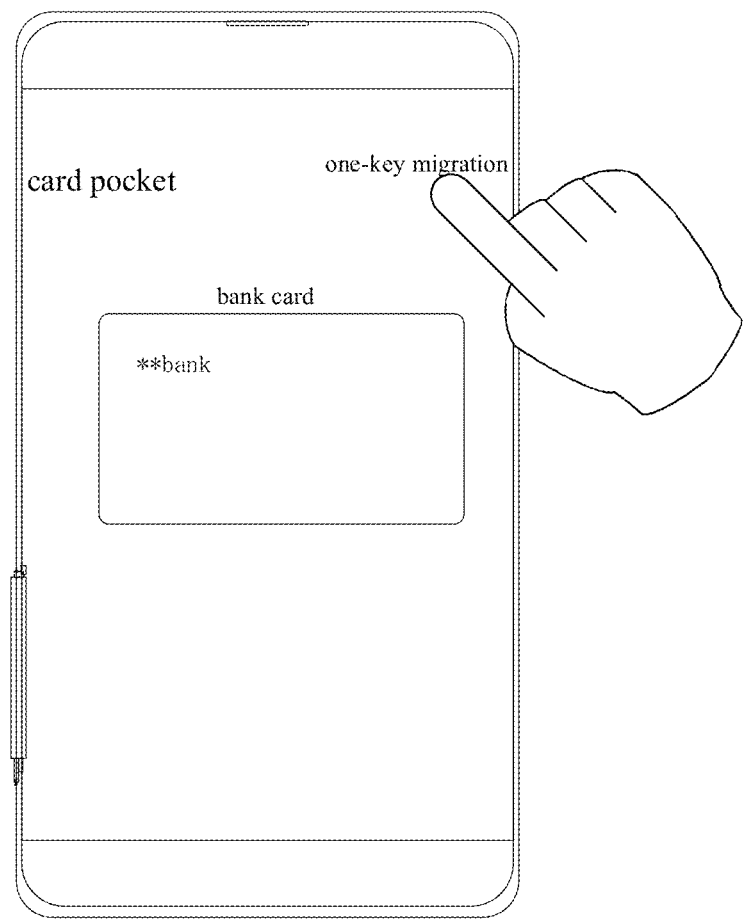
FIG. 4 to FIG. 8 are schematic diagrams of scene interfaces of a method for migrating payment card provided by the present application.
Figure 5:
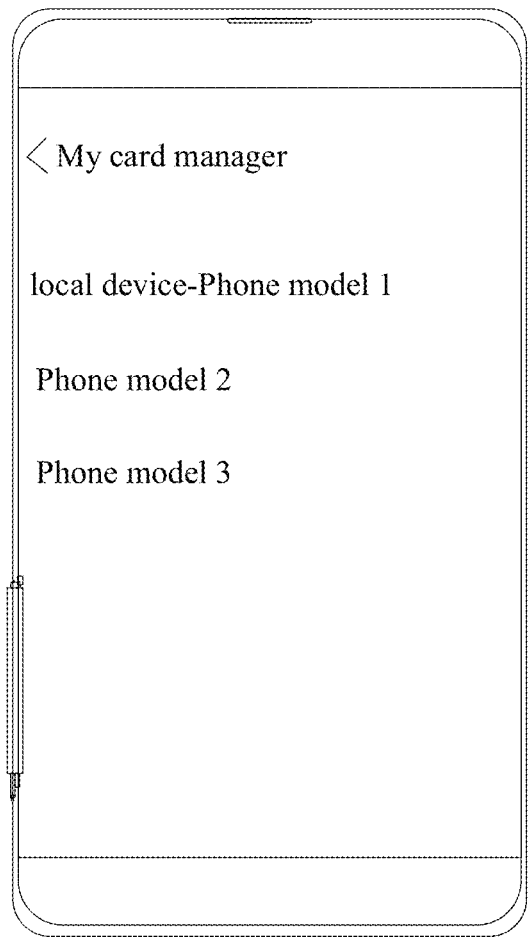

As shown in FIG. 4, after the account is logged in on the wallet application on the new electronic device, a "one-key migration" widget is displayed on the interface of the wallet application. Under a condition that the new electronic device receives a touch input on the "one-key migration" widget by the user, it displays an interface as shown in FIG. 5. At least one device identifier is displayed on the interface shown in FIG. 5. The at least one device identifier is a model of each electronic device on which the account had been logged in.

Figure 6:
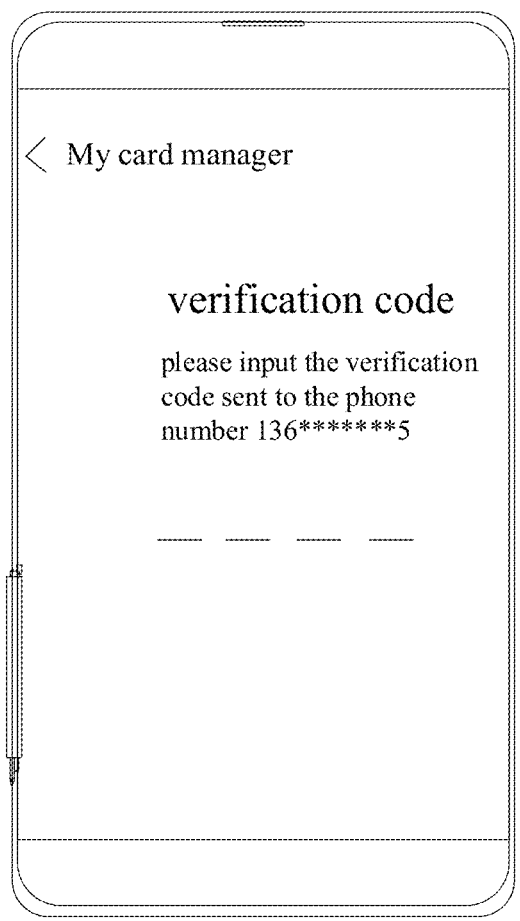

Under a condition that the new electronic device receives a first selecting operation for a target device identifier of the at least one device identifier by the user, the new electronic device displays a verification code input interface as shown in FIG. 6, and sends the target device identifier to the server, to cause the server sends the first verification code to the old electronic device based on the target device identifier.

The user may input the second verification code on the verification code input interface as shown in FIG. 6 based on the first verification code received by the old electronic device.

Figure 7:
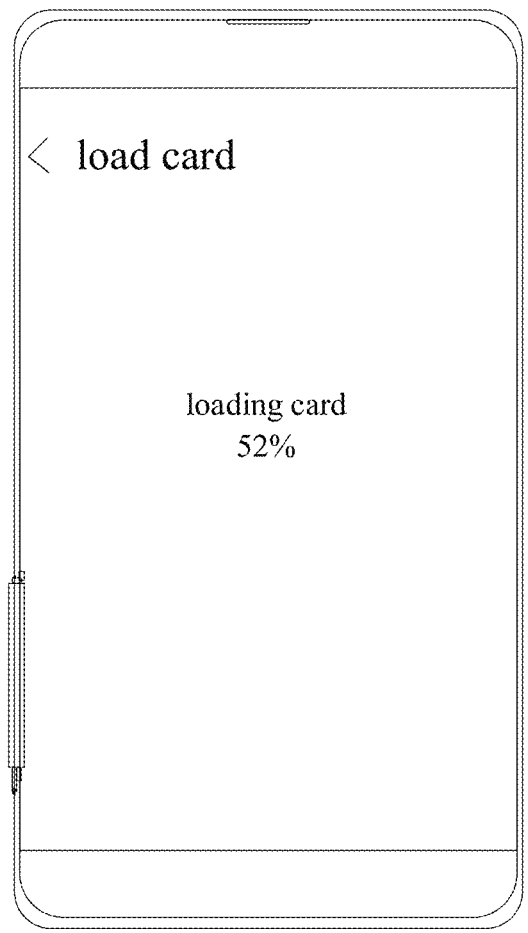

Under a condition that the new electronic device receives the second verification code input by the user, it sends the second verification code to the server, to cause the server to verify whether the first verification code and the second verification code are the same as each other, and displays an interface as shown in FIG. 7 on the new electronic device, which includes a card binding progress.

Under a condition that the server verifies that the first verification code and the second verification code are the same as each other, it migrates the payment card bound to the old electronic device to the new electronic device, and sends feedback information of successful migration to the new electronic device under a condition that the migration is succeeded.

Figure 8:
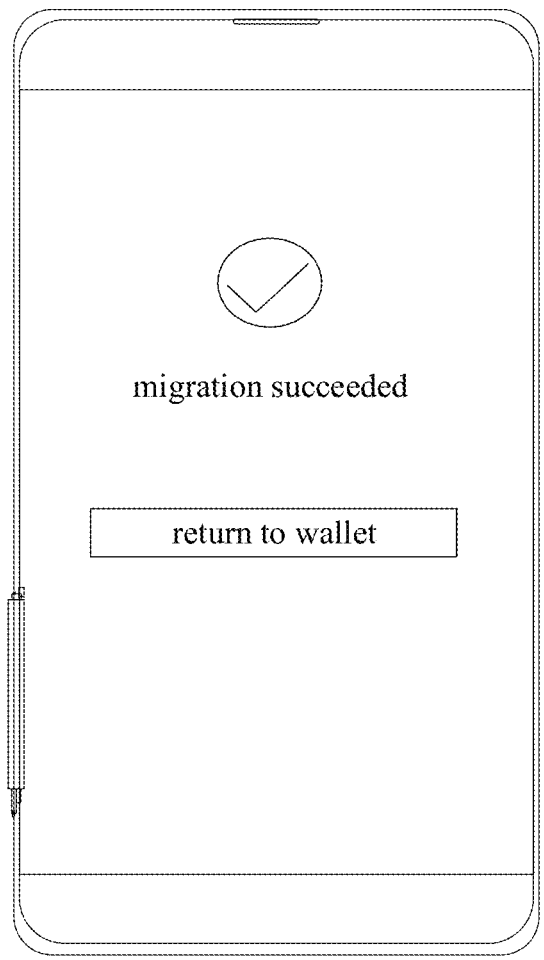

Under a condition that the new electronic device receives the feedback information of successful migration, it displays a successful migration interface as shown in FIG. 8.

Based on the above method for migrating payment card, a method for migrating payment card provided by a first aspect of the present application and a method for migrating payment card provided by a second aspect of the present application will be described below.

Figure 9:
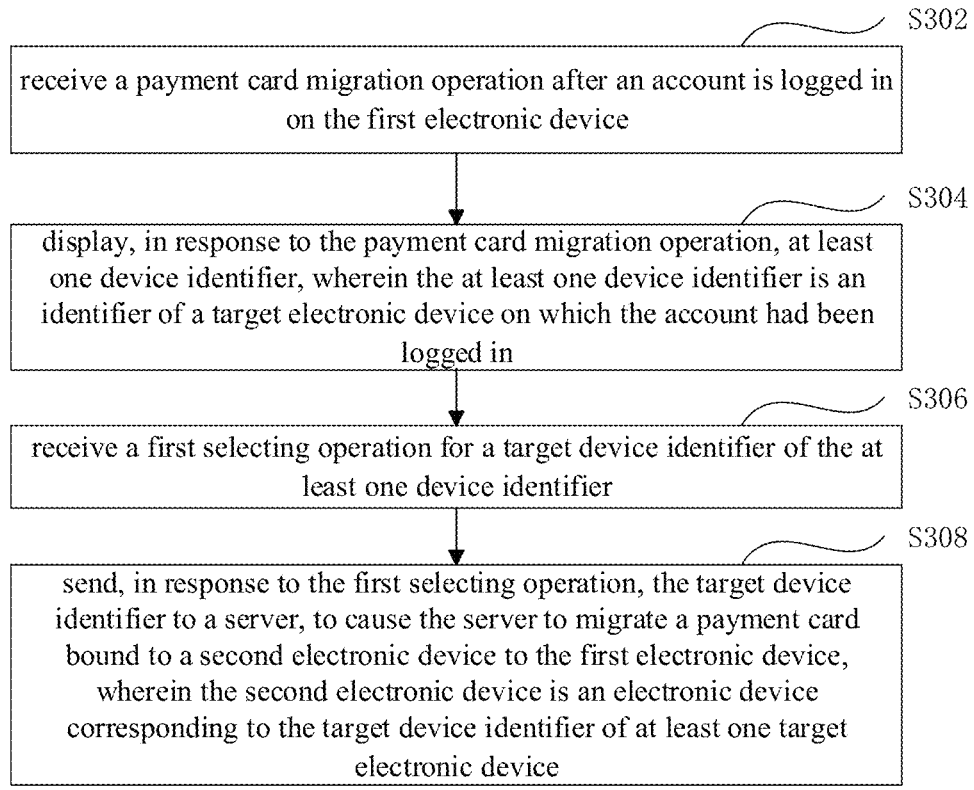
FIG. 9 is a schematic flowchart of a method for migrating payment card provided by a first aspect of the present application.

FIG. 9 is a schematic flowchart of the method for migrating payment card provided by the first aspect of the present application. The method for migrating payment card provided by the first aspect is applicable to the first electronic device. As shown in FIG. 9, the method for migrating payment card includes the follows.

In S302, a payment card migration operation is received, after an account is logged in on the first electronic device.

In S304, in response to the payment card migration operation, at least one device identifier is displayed, and the at least one device identifier is an identifier of a target electronic device on which the account had been logged in.

In S306, a first selecting operation for a target device identifier of the at least one device identifier is received.

In S308, in response to the first selecting operation, the target device identifier is sent to a server, to cause the server to migrate a payment card bound to a second electronic device to the first electronic device, and the second electronic device is an electronic device corresponding to the target device identifier of at least one target electronic device.

In the embodiment of the present application, a plurality of payment cards bound to the second electronic device may be migrated to the first electronic device simultaneously, and the user does not need to perform unbinding and binding operations on the payment cards bound to the second electronic device respectively, which simplifies the payment card migration operations performed by the user.

In one or more embodiments of the present application, the target device identifier is to cause the server to send a first verification code to the second electronic device. After S306, the method for migrating payment card may further include: displaying a verification code input interface; receiving an input operation for inputting a second verification code on the verification code input interface; and sending, in response to the input operation, the second verification code to the server, to cause the server to migrate the payment card bound to the second electronic device to the first electronic device under a condition that the second verification code is verified to be same as the first verification code.

In an embodiment of the present application, before a payment card migration is performed, the server sends the first verification code to the second electronic device. If the first electronic device and the second electronic device belong to a same user or belong to two users with an associated relationship respectively, the user of the first electronic device may obtain the first verification code received by the second electronic device, and input the first verification code on the verification code input interface of the first electronic device. In this way, whether the user who performs the card migration operation is a legitimate user may be verified by using the verification code, thereby ensuring the security during a payment card migration process.

Further, if a plurality of payment cards bound to the second electronic device need to be migrated to the first electronic device, the user only needs to input the verification code once, and does not need to input the verification code every time a payment card is bound. Moreover, the user does not need to input information such as a validity period and a card confirmation code of the payment card, which may further simplify the payment card migration operations.

In one or more embodiments of the present application, in response to the first selecting operation, the method for migrating payment card may further include: displaying at least one payment card identifier which is an identifier of a payment card bound to the second electronic device; receiving a second selecting operation for a target payment card identifier of the at least one payment card identifier; and sending, in response to the second selecting operation, the target payment card identifier to the server, wherein the target payment card identifier is to indicate to migrate a target payment card bound to the second electronic device to the first electronic device, and the target payment card is a payment card corresponding to the target payment card identifier In the embodiment of the present application, after the user selects the second electronic device for which a migration for the payment card bound thereto is to be performed, the identifier(s) of the payment card(s) bound to the second electronic device may be displayed on the first electronic device, for the user to select which one of the payment cards bound to the second electronic device is to be migrated. The user may choose to migrate all or some of the bank cards bound to the second electronic device based on his/her requirements. In this way, the user may select the payment card to be migrated on his/her own, to satisfy the user's usage needs.

In one or more embodiments of the present application, in response to the payment card migration operation and before S306, the method for migrating payment card may further include: displaying information of a payment card bound to the target electronic device.

In the embodiment of the present application, by displaying the information of the payment card bound to the target electronic device, it is convenient for the user to distinguish respective electronic devices, so as to facilitate the user to select the target device identifier from the at least one device identifier, and the selected target device identifier is an identifier of an electronic device for which the user intends to perform the migration.

In one or more embodiments of the present application, the target electronic device is an electronic device on which the account had been logged in and a payment card is bound.

Figure 10:
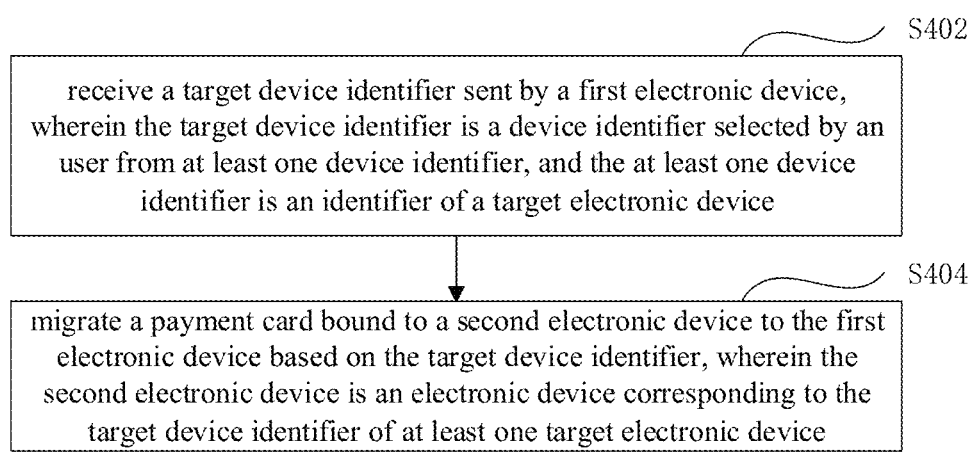
FIG. 10 is a schematic flowchart of a method for migrating payment card provided by a second aspect of the present application.

FIG. 10 is a schematic flowchart of the method for migrating payment card provided by the second aspect of the present application. The method for migrating payment card provided by the second aspect is applicable to the server. As shown in FIG. 10, the method for migrating payment card includes the follows.

In S402, a target device identifier sent by a first electronic device after an account is logged in on the first electronic device is received, the target device identifier is a device identifier selected by an user from at least one device identifier, and the at least one device identifier is an identifier of a target electronic device on which the account had been logged in.

In S404, a payment card bound to a second electronic device is migrated to the first electronic device based on the target device identifier, and the second electronic device is an electronic device corresponding to the target device identifier of at least one target electronic device.

In the embodiment of the present application, a plurality of payment cards bound to the second electronic device may be migrated to the first electronic device simultaneously, and the user does not need to perform unbinding and binding operations on the payment cards bound to the second electronic device respectively, which simplifies the payment card migration operations performed by the user.

In one or more embodiments of the present application, S404 may include: sending a first verification code to the second electronic device based on the target device identifier; receiving a second verification code sent by the first electronic device, wherein the second verification code is a verification code input by the user, based on the first verification code, on a verification code input interface of the first electronic device; and migrating the payment card bound to the second electronic device to the first electronic device under a condition that the second verification code is same as the first verification code.

In an embodiment of the present application, before a payment card migration is performed, the server sends the first verification code to the second electronic device. If the first electronic device and the second electronic device belong to a same user or belong to two users with an associated relationship respectively, the user of the first electronic device may obtain the first verification code received by the second electronic device, and input the first verification code on the verification code input interface of the first electronic device. In this way, whether the user who performs the card migration operation is a legitimate user may be verified by using the verification code, thereby ensuring the security during a payment card migration process.

Further, if a plurality of payment cards bound to the second electronic device need to be migrated to the first electronic device, the user only needs to input the verification code once, and does not need to input the verification code every time a payment card is bound. Moreover, the user does not need to input information such as a validity period and a card confirmation code of the payment card, which may further simplify the payment card migration operations.

In one or more embodiments of the present application, sending the first verification code to the second electronic device based on the target device identifier may include: under a condition that the account has been logged in on a payment application on the second electronic device, sending the first verification code to the payment application on which the account has been logged in.

In one or more embodiments of the present application, sending the first verification code to the second electronic device based on the target device identifier may include: under a condition that a SIM card has been installed on the second electronic device and a communication number corresponding to the SIM card is a predetermined communication number bound to the account, sending the first verification code to the communication number corresponding to the SIM card.

In one or more embodiments of the present application, migrating the payment card bound to the second electronic device to the first electronic device may include: sending a card binding request to a TSM system, to cause the TSM system to unbind the payment card bound to the second electronic device from the second electronic device, and to bind the unbound payment card to the first electronic device.

In one or more embodiments of the present application, before migrating the payment card bound to the second electronic device to the first electronic device, the method for migrating payment card may further include: receiving a target payment card identifier sent by the first electronic device, wherein the target payment card identifier is a payment card identifier selected by the user from at least one payment card identifier, and the at least one payment card identifier is an identifier of a payment card bound to the second electronic device.

Migrating the payment card bound to the second electronic device to the first electronic device may include: migrating a target payment card bound to the second electronic device to the first electronic device based on the target payment card identifier, wherein the target payment card is a payment card corresponding to the target payment card identifier.

In one or more embodiments of the present application, before migrating the payment card bound to the second electronic device to the first electronic device based on the target device identifier, the method further includes: obtaining at least one piece of device information from pre-stored information, based on an user identification corresponding to the account, wherein the at least one piece of device information includes hardware information of at least one electronic device to which a payment card has been bound through the account.

Migrating the payment card bound to the second electronic device to the first electronic device based on the target device identifier includes: under a condition that information of the second electronic device matches any one of the at least one piece of device information, migrating the payment card bound to the second electronic device to the first electronic device based on the target device identifier.

Figure 11:
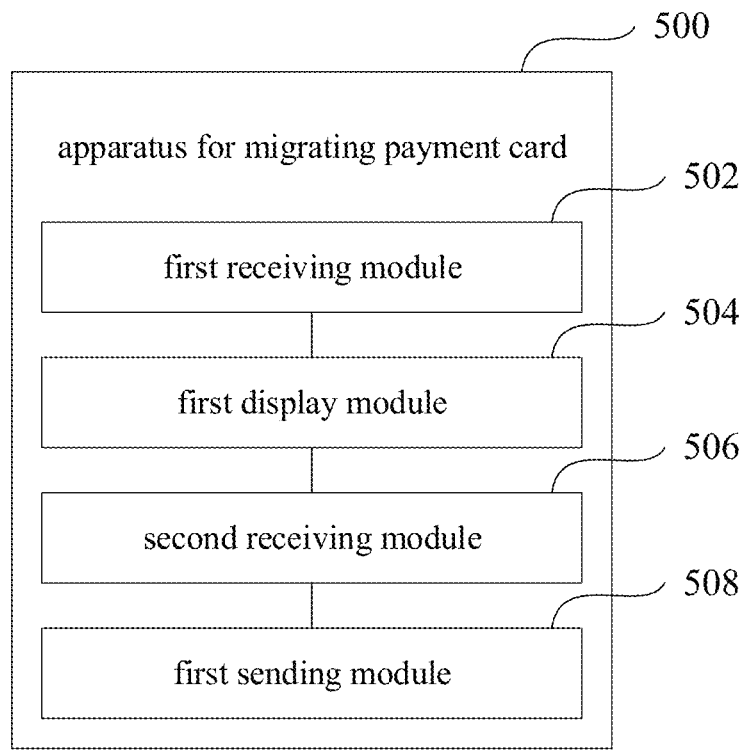
FIG. 11 is a schematic structure diagram of an embodiment of an apparatus for migrating payment card provided by a third aspect of the present application.

Corresponding to the method for migrating payment card provided by the first aspect of the present application, a third aspect of the present application provides an apparatus for migrating payment card. FIG. 11 is a schematic structure diagram of an embodiment of the apparatus for migrating payment card provided by the third aspect of the present application. As shown in FIG. 11, the apparatus for migrating payment card 500 includes: a first receiving module 502 configured to receive a payment card migration operation after an account is logged in on the first electronic device; a first display module 504 configured to display, in response to the payment card migration operation, at least one device identifier, wherein the at least one device identifier is an identifier of a target electronic device on which the account had been logged in; a second receiving module 506 configured to receive a first selecting operation for a target device identifier of the at least one device identifier; and a first sending module 508 configured to send, in response to the first selecting operation, the target device identifier to a server, to cause the server to migrate a payment card bound to a second electronic device to the first electronic device, wherein the second electronic device is an electronic device corresponding to the target device identifier of at least one target electronic device.

In the embodiment of the present application, a plurality of payment cards bound to the second electronic device may be migrated to the first electronic device simultaneously, and the user does not need to perform unbinding and binding operations on the payment cards bound to the second electronic device respectively, which simplifies the payment card migration operations performed by the user.

In one or more embodiments of the present application, the target device identifier is to cause the server to send a first verification code to the second electronic device, and the apparatus for migrating payment card 500 may further include: a second display module configured to display a verification code input interface; a fourth receiving module configured to receive an input operation for inputting a second verification code on the verification code input interface; and a second sending module configured to send, in response to the input operation, the second verification code to the server, to cause the server to migrate the payment card bound to the second electronic device to the first electronic device under a condition that the second verification code is verified to be same as the first verification code.

In an embodiment of the present application, before a payment card migration is performed, the server sends the first verification code to the second electronic device. If the first electronic device and the second electronic device belong to a same user or belong to two users with an associated relationship respectively, the user of the first electronic device may obtain the first verification code received by the second electronic device, and input the first verification code on the verification code input interface of the first electronic device. In this way, whether the user who performs the card migration operation is a legitimate user may be verified by using the verification code, thereby ensuring the security during a payment card migration process.

Further, if a plurality of payment cards bound to the second electronic device need to be migrated to the first electronic device, the user only needs to input the verification code once, and does not need to input the verification code every time a payment card is bound. Moreover, the user does not need to input information such as a validity period and a card confirmation code of the payment card, which may further simplify the payment card migration operations.

In one or more embodiments of the present application, the apparatus for migrating payment card 500 may further include: a third display module configured to display at least one payment card identifier which is an identifier of a payment card bound to the second electronic device; a fifth receiving module configured to receive a second selecting operation for a target payment card identifier of the at least one payment card identifier; and a third sending module configured to send, in response to the second selecting operation, the target payment card identifier to the server, wherein the target payment card identifier is to indicate to migrate a target payment card bound to the second electronic device to the first electronic device, and the target payment card is a payment card corresponding to the target payment card identifier.

In the embodiment of the present application, after the user selects the second electronic device for which a migration for the payment card bound thereto is to be performed, the identifier(s) of the payment card(s) bound to the second electronic device may be displayed on the first electronic device, for the user to select which one of the payment cards bound to the second electronic device is to be migrated. The user may choose to migrate all or some of the bank cards bound to the second electronic device based on his/her requirements. In this way, the user may select the payment card to be migrated on his/her own, to satisfy the user's usage needs.

In one or more embodiments of the present application, the apparatus for migrating payment card 500 may further include: a fourth display module configured to display information of a payment card bound to the target electronic device.

In the embodiment of the present application, by displaying the information of the payment card bound to the target electronic device, it is convenient for the user to distinguish respective electronic devices, so as to facilitate the user to select the target device identifier from the at least one device identifier, and the selected target device identifier is an identifier of an electronic device for which the user intends to perform the migration.

In one or more embodiments of the present application, the target electronic device is an electronic device on which the account had been logged in and a payment card is bound.

Figure 12:
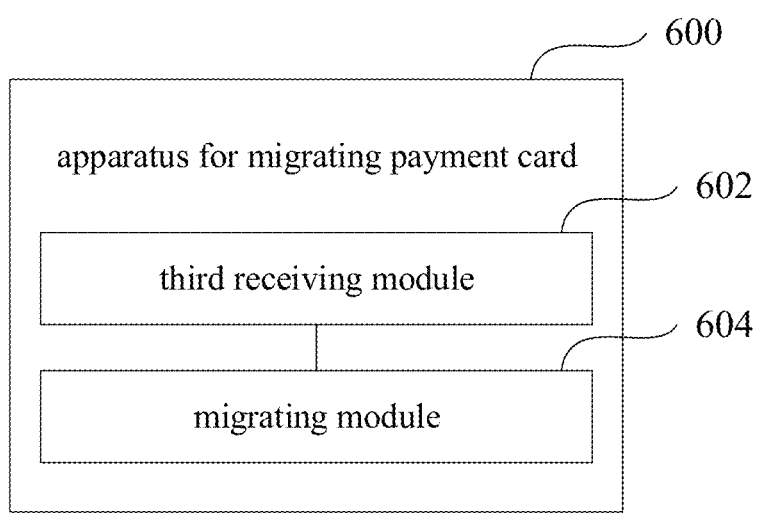
FIG. 12 is a schematic structure diagram of an embodiment of an apparatus for migrating payment card provided by a fourth aspect of the present application.

Corresponding to the method for migrating payment card provided by the second aspect of the present application, a fourth aspect of the present application provides an apparatus for migrating payment card. FIG. 12 is a schematic structure diagram of an embodiment of the apparatus for migrating payment card provided by the fourth aspect of the present application. As shown in FIG. 12, the apparatus for migrating payment card 600 includes: a third receiving module 602 configured to receive a target device identifier sent by a first electronic device after an account is logged in on the first electronic device, wherein the target device identifier is a device identifier selected by an user from at least one device identifier, and the at least one device identifier is an identifier of a target electronic device on which the account had been logged in; and a migrating module 604 configured to migrate a payment card bound to a second electronic device to the first electronic device based on the target device identifier, wherein the second electronic device is an electronic device corresponding to the target device identifier of at least one target electronic device.

In the embodiment of the present application, a plurality of payment cards bound to the second electronic device may be migrated to the first electronic device simultaneously, and the user does not need to perform unbinding and binding operations on the payment cards bound to the second electronic device respectively, which simplifies the payment card migration operations performed by the user.

In one or more embodiments of the present application, the migration module 604 may include: a first sending unit configured to send a first verification code to the second electronic device based on the target device identifier; a first receiving unit configured to receive a second verification code sent by the first electronic device, wherein the second verification code is a verification code input by the user, based on the first verification code, on a verification code input interface of the first electronic device; and a migrating unit configured to migrate the payment card bound to the second electronic device to the first electronic device under a condition that the second verification code is same as the first verification code.

In an embodiment of the present application, before a payment card migration is performed, the server sends the first verification code to the second electronic device. If the first electronic device and the second electronic device belong to a same user or belong to two users with an associated relationship respectively, the user of the first electronic device may obtain the first verification code received by the second electronic device, and input the first verification code on the verification code input interface of the first electronic device. In this way, whether the user who performs the card migration operation is a legitimate user may be verified by using the verification code, thereby ensuring the security during a payment card migration process.

Further, if a plurality of payment cards bound to the second electronic device need to be migrated to the first electronic device, the user only needs to input the verification code once, and does not need to input the verification code every time a payment card is bound. Moreover, the user does not need to input information such as a validity period and a card confirmation code of the payment card, which may further simplify the payment card migration operations.

In one or more embodiments of the present application, the first sending unit may be particularly configured to: under a condition that the account has been logged in on a payment application on the second electronic device, send the first verification code to the payment application on which the account has been logged in.

In one or more embodiments of the present application, the first sending unit may be particularly configured to: under a condition that a SIM card has been installed on the second electronic device and a communication number corresponding to the SIM card is a predetermined communication number bound to the account, send the first verification code to the communication number corresponding to the SIM card.

In one or more embodiments of the present application, the migrating unit may be particularly configured to: send a card binding request to a trusted service manager TSM system, to cause the TSM system to unbind the payment card bound to the second electronic device from the second electronic device, and to bind the unbound payment card to the first electronic device.

In one or more embodiments of the present application, the apparatus for migrating payment card 600 may further include: a sixth receiving module configured to receive a target payment card identifier sent by the first electronic device, wherein the target payment card identifier is a payment card identifier selected by the user from at least one payment card identifier, and the at least one payment card identifier is an identifier of a payment card bound to the second electronic device.

The migrating module 604 may be particularly configured to: migrate a target payment card bound to the second electronic device to the first electronic device based on the target payment card identifier, wherein the target payment card is a payment card corresponding to the target payment card identifier.

In one or more embodiments of the present application, the apparatus for migrating payment card 600 may further include: a obtaining module configured to obtain at least one piece of device information from pre-stored information, based on an user identification corresponding to the account, wherein the at least one piece of device information includes hardware information of at least one electronic device to which a payment card has been bound through the account.

The migration module 604 may be particularly configured to: under a condition that information of the second electronic device matches any one of the at least one piece of device information, migrate the payment card bound to the second electronic device to the first electronic device based on the target device identifier.

A fifth aspect of the present application provides an electronic device, and the electronic device includes: a processor and a memory storing computer program instructions, and the processor is configured to implement, when executing the computer program instructions, steps of the method for migrating payment card provided by the first aspect.

A sixth aspect of the present application provides a server, and the server includes: a processor and a memory storing computer program instructions, and the processor is configured to implement, when executing the computer program instructions, steps of the method for migrating payment card provided by the second aspect.

Figure 13:
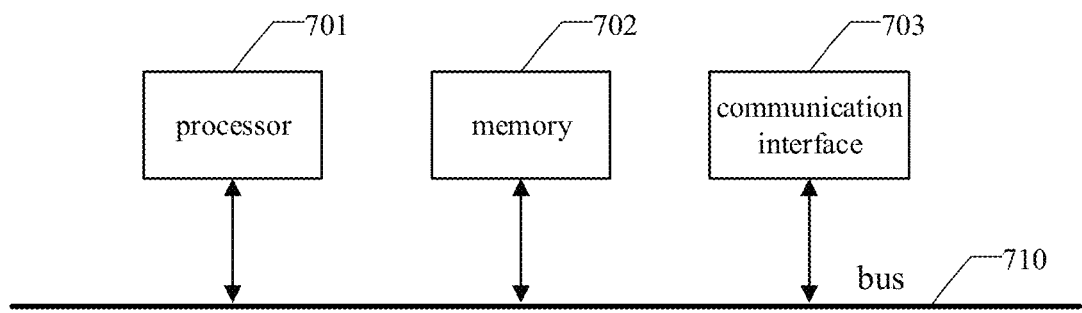
FIG. 13 shows a schematic structure diagram of an embodiment of a device for migrating payment card provided by the present application.

FIG. 13 shows a schematic structure diagram of an embodiment of a device for migrating payment card provided by the present application. The device for migrating payment card may be the electronic device provided by the fifth aspect of the present application or the server provided by the sixth aspect of the present application.

The device for migrating payment card may include a processor 701 and a memory 702 storing computer program instructions.

In particular, the processor 701 described above may include a central processing unit (CPU), or an application specific integrated circuit (ASIC), or may be configured as one or more integrated circuits implementing the embodiments of the present application.

The memory 702 may include a mass storage for data or instructions. By way of example and not limitation, the memory 702 may include a hard disk drive (HDD), a floppy disk drive, a flash memory, an optical disk, a magneto-optical disk, a magnetic tape, or a universal serial bus (USB) drive, or a combination of two or more of the above. For example, memory 702 may include a removable or non-removable (or fixed) medium, where appropriate. For example, the memory 702 may be may be internal or external to an integrated gateway disaster recovery device, where appropriate. In certain embodiments, the memory 702 is a non-volatile solid state memory.

The memory may include a read only memory (ROM), a random access memory (RAM), a magnetic disk storage media device, an optical storage medium device, a flash memory device, or an electrical, optical or other physical/tangible memory storage device. Thus, generally, the memory includes one or more tangible (non-transitory) computer-readable storage medium (e.g., a storage device) encoded with software including computer-executable instructions, and when the software is executed (e.g., by one or more processors), it may be operated to perform the operations described with reference to the method according to the first or second aspect of the present disclosure.

The processor 701 reads and executes the computer program instructions stored in the memory 702 to implement the steps of the method for migrating payment card of any one of the above embodiments.

In some examples, the device for migrating payment card may further include a communication interface 703 and a bus 710. As shown in FIG. 13, the processor 701, the memory 702, and the communication interface 703 are connected through the bus 710 and implement communication with one another.

The communication interface 703 is mainly configured to implement the communication among the modules, apparatuses, units and/or devices in the embodiments of the present application.

The bus 710 includes a hardware or a software or both, which may couple the components of the device for migrating payment card with one another. By way of example and not limitation, the bus 710 may include an accelerated graphics port (AGP) or other graphics bus, an enhanced industry standard architecture (EISA) bus, a front side bus (FSB), a hyper transport (HT) interconnect, an industry standard architecture (ISA)) bus, an InfiniBand Interconnect, a low pin count (LPC) bus, a memory bus, a micro-channel architecture (MCA) bus, a peripheral component interconnect (PCI) bus, a PCI-express (PCI-X) bus, a serial advanced technology attachment (SATA) bus, a Video Electronics Standards Association Local (VLB) bus or other suitable bus or a combination of two or more of the above. For example, the bus 710 may include one or more buses, where appropriate. Although the embodiments of the present application describe and illustrate the particular buses, the present application may include any suitable bus or interconnect.

Further, in combination with the method for migrating payment card in the above embodiments, the embodiments of the present application may provide a computer-readable storage medium for implementing the method. Computer program instructions are stored on the computer-readable storage medium, and the computer program instructions, when executed by a processor, cause the processor to implement the method for migrating payment card of any one of the above embodiments. Examples of the computer-readable storage medium shown include a non-transitory computer-readable storage medium, such as a read-only memory (ROM), a random access memory (RAM), a magnetic disk or an optical disc and so on.

It is to be understood that the present disclosure is not limited to the specific configurations and processes described above and illustrated in the figures. For the sake of brevity, the detailed descriptions of well-known methods are omitted here. In the above-described embodiments, many specific steps are described and shown as examples. However, the process of the method of the present disclosure is not limited to the specific steps described and shown, and those skilled in the art may make various changes, modifications and additions, or a change of the order of steps after understanding the spirit of the present disclosure.

The functional block shown in the above described structural block diagrams may be implemented as a hardware, a software, a firmware, or a combination thereof. When implemented in hardware, the functional blocks may be, for example, an electronic circuit, an application specific integrated circuit (ASICs), a suitable firmware, a plug-in, a function card, and the like. When implemented in software, the elements of the present disclosure are programs or code segments used to perform the required tasks. The programs or code segments may be stored on a machine-readable medium or transmitted over a transmission medium or communication link by a data signal carried in a carrier wave. A "machine-readable medium" may include any medium that may store or transmit information. Examples of machine-readable medium include an electronic circuits, a semiconductor memory device, a ROM, a flash memory, an erasable ROM (EROM), a floppy disk, CD-ROMs, an optical disk, a hard disk, a fiber optic medium, a radio frequency (RF) link, and the like. The code segments may be downloaded via a computer network such as the Internet, or an intranet.

It should also be noted that the exemplary embodiments mentioned in this application describe some methods or systems based on a series of steps or apparatus. However, the present application is not limited to the order of the above steps, that is, the steps may be performed in the order mentioned in the embodiment, or different from the order in the embodiment, or several steps may be performed simultaneously.

Aspects of the present application are described above with reference to flowchart illustrations and/or block diagrams of methods, apparatus (systems) and computer program products according to embodiments of the present application. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine which enables the instructions executed via the processor of the computer or other programmable data processing apparatus to implement the functions/acts specified in one or more blocks of the flowcharts and/or block diagrams. Such processor may be, but not limited to, a general purpose processor, a special purpose processor, an application specific processor, or a field programmable logic circuit. It will further be understood that each block of the block diagrams and/or flowcharts and a combination of blocks in the block diagrams and/or flowchart may also be implemented by a special purpose hardware for performing specified functions or actions, or by a combination of a special purpose hardware and computer instructions.

The above are only specific implementations of the present application. Those skilled in the art may clearly understand that, for the convenience and brevity of description, the specific operation processes of the above-described systems, modules and units may refer to the foregoing method embodiments, which are not repeated herein. It should be understood that the protection scope of the present application is not limited to this. Any person skilled in the art may easily conceive of various equivalent modifications or replacements within the technical scope disclosed in the present application, and these modifications or replacements should all fall within the protection scope of this application.

What is claimed is:

1. A method for migrating payment card, applicable to a first electronic device, the method comprising:
   receiving a payment card migration operation after an account is logged in on the first electronic device;
   displaying, in response to the payment card migration operation, at least one device identifier, wherein the at least one device identifier is an identifier of a target electronic device on which the account had been logged in;
   receiving a first selecting operation for a target device identifier of the at least one device identifier;
   sending, in response to the first selecting operation, the target device identifier to a server, to cause the server to migrate a payment card bound to a second electronic device to the first electronic device, wherein the second electronic device is an electronic device corresponding to the target device identifier of at least one target electronic device; and
   wherein the target device identifier is to cause the server to send a first verification code to the second electronic device; and
   after receiving the first selecting operation for the target device identifier of the at least one device identifier, the method further comprises:
   displaying a verification code input interface;
   receiving an input operation for inputting a second verification code on the verification code input interface; and
   sending, in response to the input operation, the second verification code to the server, to cause the server to migrate the payment card bound to the second electronic device to the first electronic device under a condition that the second verification code is verified to be same as the first verification code.

2. The method according to claim 1, wherein in response to the first selecting operation, the method further comprises:
   displaying at least one payment card identifier which is an identifier of a payment card bound to the second electronic device;
   receiving a second selecting operation for a target payment card identifier of the at least one payment card identifier; and
   sending, in response to the second selecting operation, the target payment card identifier to the server, wherein the target payment card identifier is to indicate to migrate a target payment card bound to the second electronic device to the first electronic device, and the target payment card is a payment card corresponding to the target payment card identifier.

3. The method according to claim 1, wherein in response to the payment card migration operation and before receiving the first selecting operation for the target device identifier of the at least one device identifier, the method further comprises:
   displaying information of a payment card bound to the target electronic device.

4. The method according to claim 1, wherein the target electronic device is an electronic device on which the account had been logged in and a payment card is bound.

5. A method for migrating payment card, applicable to a server, the method comprising:
   receiving a target device identifier sent by a first electronic device after an account is logged in on the first electronic device, wherein the target device identifier is a device identifier selected by an user from at least one device identifier, and the at least one device identifier is an identifier of a target electronic device on which the account had been logged in;

migrating a payment card bound to a second electronic device to the first electronic device based on the target device identifier, wherein the second electronic device is an electronic device corresponding to the target device identifier of at least one target electronic device; and wherein migrating the payment card bound to the second electronic device to the first electronic device based on the target device identifier comprises:

sending a first verification code to the second electronic device based on the target device identifier;

receiving a second verification code sent by the first electronic device, wherein the second verification code is a verification code input by the user, based on the first verification code, on a verification code input interface of the first electronic device; and migrating the payment card bound to the second electronic device to the first electronic device under a condition that the second verification code is same as the first verification code.

6. The method according to claim 5, wherein sending the first verification code to the second electronic device based on the target device identifier comprises:

under a condition that the account has been logged in on a payment application on the second electronic device, sending the first verification code to the payment application on which the account has been logged in.

7. The method according to claim 5, wherein sending the first verification code to the second electronic device based on the target device identifier comprises:

under a condition that a subscriber identity module SIM card has been installed on the second electronic device and a communication number corresponding to the SIM card is a predetermined communication number bound to the account, sending the first verification code to the communication number corresponding to the SIM card.

8. The method according to claim 5, wherein migrating the payment card bound to the second electronic device to the first electronic device comprises:

sending a card binding request to a trusted service manager TSM system, to cause the TSM system to unbind the payment card bound to the second electronic device from the second electronic device, and to bind the unbound payment card to the first electronic device.

9. The method according to claim 5, wherein before migrating the payment card bound to the second electronic device to the first electronic device, the method further comprises:

receiving a target payment card identifier sent by the first electronic device, wherein the target payment card identifier is a payment card identifier selected by the user from at least one payment card identifier, and the at least one payment card identifier is an identifier of a payment card bound to the second electronic device, and wherein migrating the payment card bound to the second electronic device to the first electronic device comprises:

migrating a target payment card bound to the second electronic device to the first electronic device based on the target payment card identifier, wherein the target payment card is a payment card corresponding to the target payment card identifier.

10. The method according to claim 5, wherein before migrating the payment card bound to the second electronic device to the first electronic device based on the target device identifier, the method further comprises:

obtaining at least one piece of device information from pre-stored information, based on an user identification corresponding to the account, wherein the at least one piece of device information comprises hardware information of at least one electronic device to which a payment card has been bound through the account, and wherein migrating the payment card bound to the second electronic device to the first electronic device based on the target device identifier comprises:

under a condition that information of the second electronic device matches any one of the at least one piece of device information, migrating the payment card bound to the second electronic device to the first electronic device based on the target device identifier.

\* \* \* \* \*